(12) United States Patent
Branton et al.

(10) Patent No.: US 12,216,567 B2
(45) Date of Patent: Feb. 4, 2025

(54) TEST AND AUTOMATED REMEDIATION OF DEPOLYED COMPUTING PRODUCTS

(71) Applicant: Ivanti, Inc., South Jordan, UT (US)

(72) Inventors: Paul Keith Branton, Rochdale (GB); Jens Miltner, Neunkirchen am Brand (DE)

(73) Assignee: Ivanti, Inc., South Jordan, UT (US)

( * ) Notice: Subject to any disclaimer, the term of this patent is extended or adjusted under 35 U.S.C. 154(b) by 31 days.

(21) Appl. No.: 18/361,383

(22) Filed: Jul. 28, 2023

(65) Prior Publication Data

US 2024/0037018 A1    Feb. 1, 2024

Related U.S. Application Data

(60) Provisional application No. 63/369,912, filed on Jul. 29, 2022.

(51) Int. Cl.
 *G06F 11/36* (2006.01)
(52) U.S. Cl.
 CPC ........ *G06F 11/366* (2013.01); *G06F 11/3664* (2013.01); *G06F 11/3688* (2013.01)
(58) Field of Classification Search
 None
 See application file for complete search history.

(56) References Cited

U.S. PATENT DOCUMENTS

| | | | |
|---|---|---|---|
| 2007/0220032 A1* | 9/2007 | Kapoor | G06F 8/61 707/999.102 |
| 2012/0144385 A1* | 6/2012 | Ross | G06F 8/61 717/174 |
| 2016/0224406 A1* | 8/2016 | Ilic | G06F 11/0748 |
| 2021/0281611 A1* | 9/2021 | Blitz | H04L 63/10 |
| 2021/0326196 A1* | 10/2021 | Moss | G06F 11/3692 |
| 2022/0043791 A1* | 2/2022 | Dwarampudi | G06N 5/022 |
| 2022/0141085 A1* | 5/2022 | Singhal | H04L 67/1097 709/221 |
| 2023/0116748 A1* | 4/2023 | Rowe | H04L 41/0663 709/224 |
| 2023/0274006 A1* | 8/2023 | Dang | G06F 21/568 726/25 |
| 2024/0289230 A1* | 8/2024 | Chopra | G06F 11/1433 |

* cited by examiner

Primary Examiner — Kamini B Patel

(57) ABSTRACT

A method of evaluating a computer-implemented product that is deployed on one or more endpoints. The method includes identifying a first program and a second program of a product deployed on a first endpoint of multiple endpoints. The method includes implementing a diagnostic process at the first endpoint. The diagnostic process includes a first subroutine directed to the first program and a second subroutine directed to a second program. The subroutines each execute installation and functional parameter tests of the programs. Responsive to the first subroutine indicating that the first program is operational, the method includes outputting data that the first subroutine passed. Responsive to the second subroutine returning an unexpected result, the method includes outputting data indicating details of the unexpected result and implementing a remediation that modifies the second program or a condition at the first endpoint to mitigate the unexpected result.

20 Claims, 9 Drawing Sheets

```
Agent Version: 1.2.0
Platform Version: 1.0.401 macOS Version 11.6.5 (Build 20GS27)
ENTITYCLOUD Agent (1.0.XXX)(SDK: 1.2.0.XXXX) Architecture: Intel Status
Agent id:              YYYYSSSCCCCS8ES111C1111111111EE11C22E
Registration state:    Registered
Policy name:           grp:1111111-1111-1111-YYbd-XXdZZccXa43
Last check-in time:    2022-04-19T15:11:11.XXXXXZ
Console id:            1111111-1111-1111-1111-05XXXXXXACO
Manufacturer:          Entity
Manufacturer id:       com.entity.cloud.agent
Maintenance Window:    <Not defined>

Installed engines
Agent WildPulse Service  [1.1.0.YYX   UNO.WILDPULSE.ENGINEMAC64)
An engine that runs inventory. (1.1.0.XYZ  UNO.INVENTORY.ENGINE64MAC64)
Entity Automation Mac Engine (1.0.XXX.YYY UNO.AUTOMATION.ENGINEMAC64]
EntityRemoteControl [1.X.X.XXX  AGENTREMOTECONTROL.MAC]

Diagnostics
<None>
```

FIG. 6

| | |
|---|---|
| ---Begin diagnostics--- | |
| 06:53.717 | Attempting Direct HTTP connection to host SLC-LDMS.ld.entity.com:80 |
| 06:53.718 | Starting HTTP session with host SLC-LDMS.ld.entity.com:80, proxy "", and proxy user"" |
| 06:54.417 | Direct connection failed 3 IO error |
| 06:54.417 | Using certificate file /usr/local/Entity/common/c:baroot/broker/broker.ut and keyfile/usr/local/entity/common/cbaroot/broker/broker.key |
| 06:54.420 | Certificate/key loaded. CertWicate file "/usr/local/entity/common/cbaroot/broker/broker.crt". Key file "/usr/local}entity/common/cbaroot/broker/broker.key" |
| 06:54.422 | Certificate/key loaded. Certificate file /usr/local/entity/common/cbaroot/broker/broker.crt". Key file "/usr/local/entity/common/cbaroot/broker/broker.key" |
| 06:54.422 | Attempting management gatway connection at host itcsa.entity.com,itcsa2.entity.com and address 67.XXX.YYY.ZZ, 67.XXX.YYY.ZX |
| 06:54.422 | Starting HTTPS session with host itcsa.entity.com, proxy"", and proxy user"" |
| 06:54.423 | Attempting to connect to IP address 67.XXX.YYY.ZZ on port ZZZ |
| 06:55.190 | Waiting for link connection to core through management gateway |
| 06:55.190 | Beginning link request |
| 06:55.190 | HTTPS Request: POST/services/link?org=org%3DEntity |
| 06:55.190 | Waiting for match response |
| 06:55.190 | Waiting for HTTPS response |
| 06:55.343 | HTTPS response finished status 201 description Created |
| 06:55.343 | Creating session from client computer though management gateway to core computer |
| 06:55.491 | Starting long session client |
| 06:55.653 | Match request completed 0 Success |
| 06:55.653 | Link to core successful |
| 06:55.653 | HTTPS Request POST /entity/managementsuite/core/core.anonymous/ClientCertificateRequest.asmx |
| 06:55.653 | Waiting for HTTPS response |
| 06:55.805 | HTTPS response finished status 200 description OK closed |

```
1   //
2   // MDMEnrollTest.swift
3   // MIB
4   //
5   //
6   //
7
8   import Foundation
9   import IVInventoryKit
10
11  @objc
12  class MDMEnrollTest : BuiltinDiagnosticTest {
13      override func run (process:
14          (DiagnosticTest, TestState, String?, [Striing:CustomStringConvertible] ?) -> Void) {
15          let inventoryData = InventoryData()
16          let mdmInfo = inventoryData.getMDMInfo()
17          var enrolled = true
18          var details = ""
19          switch mdmInfo.mdmState {
20          case .notEnrolled:
21              enrolled = false
22              details = "Not Enrolled\nThis is a fail if you thought you were"
23          case .enrolledByDEP:
24              details = "enrolled by DEP\n"
25          case .enrolledUserApproved:
26              details = "User Approved\n"
27          case .enrolledNotUserApproved:
28              details = "Not User Approved\n"}
29          if enrolled {
30              if let installDate = mdmInfo.profileInstallDate {
31                  details += "Profile Install Date = \(installDate)\n"}
32              if let url = mdmInfo.serverURL {details += "Installed from:\(url)\n"}
33              if let vendor = mdmInfo.vendor {details += "Installed by:\(vendor)"}
34              else {details += "no vendor"}}
35          progress(self, enrolled ? .passed : .partial, details, nil ) }}
```

TEST AND AUTOMATED REMEDIATION OF DEPOLYED COMPUTING PRODUCTS

CROSS-REFERENCE TO RELATED APPLICATION

This application claims priority to and the benefit if U.S. Provision Application No. 63/369,912, file Jul. 29, 2022, which is incorporated herein by reference in its entirety.

FIELD

The embodiments described in this disclosure are related to test and automated remediation of deployed computing products, and in particular to template-based product diagnostic tests including program-specific test subroutines.

BACKGROUND

After deployment of a computing product on a device the product may be tested to ensure functionality. For instance, the product may be tested prior to allowing a customer or a user to operate the product or the product might be tested periodically to ensure proper function as the customer or the user operates the product.

In some conventional systems, the product may be assessed at least partially by a local agent. For instance, test routines may be implemented by the local agent and results may be caused to be displayed to a user or communicated to a remote service device. However, these conventional systems cannot be implemented in circumstances in which the local agent is inoperable. Alternatively, the testing may be implemented remotely by the service device. Remote testing oftentimes uses the local agent to access data and control the tested device. Again, these conventional systems cannot be implemented in circumstances in which the local agent is inoperable.

Additionally, conventional systems suffer from further limitations and inefficiencies. For example, conventional systems may implement testing on each device in which the product is deployed. Accordingly, results data may be repetitive, cumulative, and voluminous. Moreover, the results data may be poorly organized which may require individualized review. Remediation in conventional systems may also be inefficient and labor-intensive. For instance, the results data from tests may be reviewed and a remediation may be manually implemented on a device-by-device basis by the user or an administrator.

Accordingly, there is a need for an improved product test and remediation system to address these and other technical limitations of conventional systems.

The subject matter claimed herein is not limited to embodiments that solve any disadvantages or that operate only in environments such as those described. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which:

FIG. 6 depicts a block diagram of an example window that may be implemented in the diagnostic process of FIG. 2;

FIG. 7 depicts an example of diagnostic status data that may be generated during a diagnostic process such as the diagnostic process of FIG. 2;

FIG. 8 is example programming code that may be executed to perform one of the tests of the diagnostic process of FIG. 2.

SUMMARY

Figure 1:
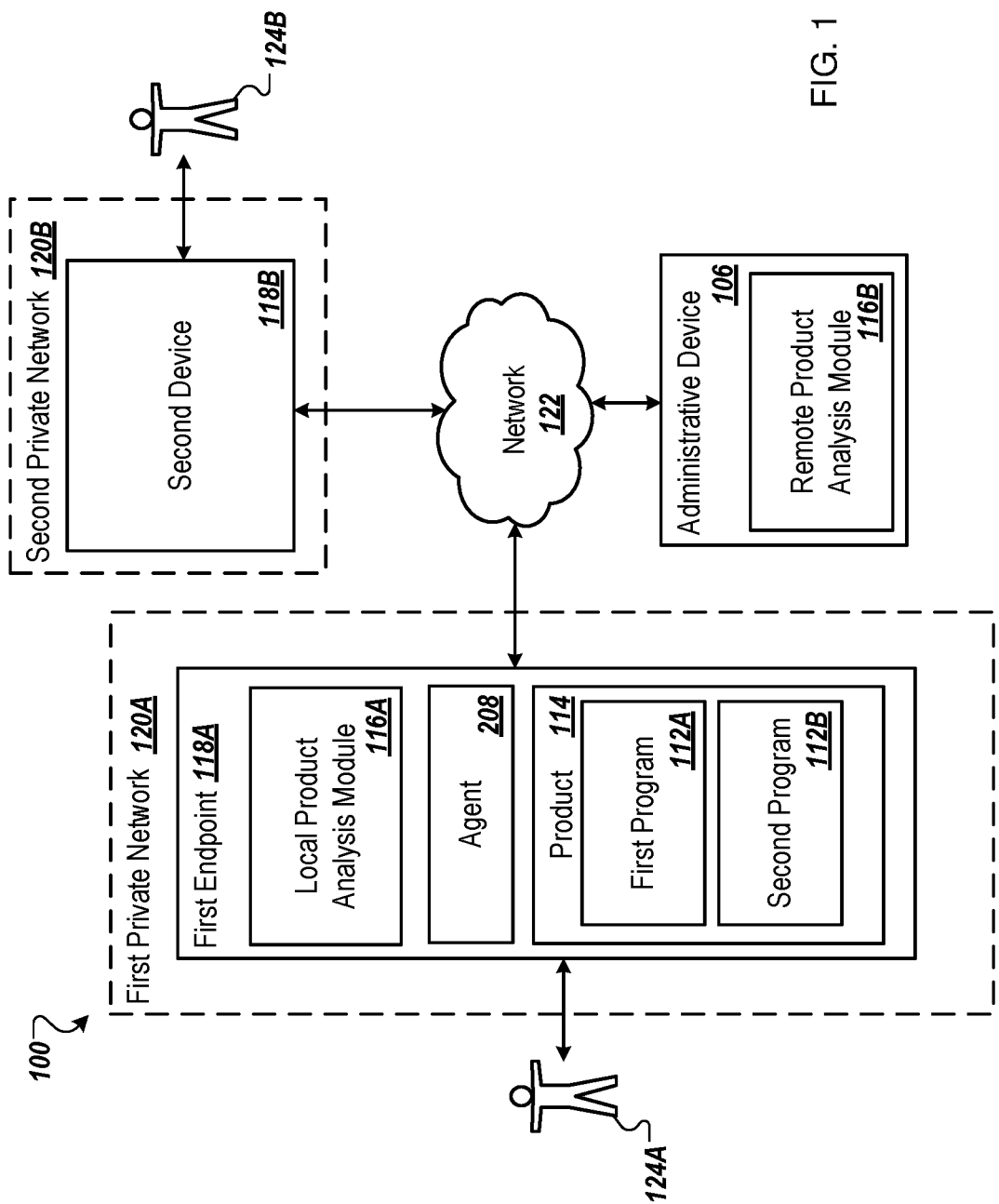
FIG. 1 depicts an example operating environment in which some embodiments of the present disclosure may be implemented.

According to an aspect of the invention, an embodiment includes a method of evaluating a computer-implemented product that is deployed on one or more endpoints. The method may include identifying a first program and a second program of a product deployed on a first endpoint of one or more endpoints. The method may include implementing a diagnostic process at the first endpoint. The diagnostic process may include multiple subroutines including a first subroutine that is directed to the first program and a second subroutine that is directed to a second program. The first and second subroutines may each execute a set of installation and functional parameter tests of the first and second programs, respectively. The method may include itemizing results of the first subroutine and the second subroutine according to a corresponding program. In response to the results of the first subroutine indicating that the first program is installed and operational at the first endpoint, the method may include outputting data indicating the first program successfully passed the first subroutine. In response to a first test of the set of installation and functional parameter tests of the second subroutine returning an unexpected result, the method may include outputting data indicating the second program failed the second subroutine and details of the first test and the unexpected result and implementing a remediation specific to the unexpected result and the first test. The remediation may be configured to modify the second program or a condition at the first endpoint to mitigate the unexpected result and enable the second program to pass the first test.

An additional aspect of an embodiment includes a non-transitory computer-readable medium having encoded therein programming code executable by one or more processors to perform or control performance at least a portion of the method described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

DESCRIPTION OF SOME EXAMPLE EMBODIMENTS

The embodiments described in this disclosure are related to test and automated remediation of deployed computing products, and in particular to template-based product diagnostic tests including program-specific test subroutines. These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 depicts an example operating environment 100 in which some embodiments of the present disclosure may be implemented. The operating environment 100 may be configured to assess a product 114 of endpoints 118A and/or 118B (generally, endpoint 118 or endpoints 118). Assessment of the product 114 may be implemented by product analysis modules 116A and/or 116B (generally, product analysis module 116 or product analysis modules 116) on the first endpoint 118A or the administrative device 106. The assessment may be implemented by the product analysis module 116 after the product 114 is loaded to the first endpoint 118A and prior to utilization of the product 114 by a user 124. The product analysis module 116 may be separate from an agent 208 of the first endpoint 118A and may at least partially test functionality of the agent 208. Accordingly, the functionality of the product 114 may be assessed prior to the agent 208 being loaded or in circumstances in which the agent 208 is inoperable or partially inoperable.

In some conventional systems, a product such as the product 114 may be assessed by the agent 208 or using the agent 208. For instance, the agent 208 may have a high level of access to systems of the first endpoint 118A. The agent 208 may implement testing routines or access data related to parameters on the first endpoint 118A. The agent may then communicate data indicative of the parameter and/or results of the testing to an administrator device 106. These and other conventional systems cannot be implemented in devices such as the endpoints 118, having an inoperable agent. Some embodiments of the present disclosure address this technical shortcoming.

Moreover, even in circumstances in which the agent 208 is functional, in some conventional systems, agent-based product assessments simply provide data regarding the assessment to the administrative device 106. After the data is received, an administrator reviews and organizes the data and manually implements a remediation. Additionally, the product 114 may include multiple programs 112A and 112B. The programs 112 may be substantially separate. Accordingly, inoperability of a first program 112A may not necessitate inoperability of a second program 112B. Conventional, agent-based product assessment may mix results from testing of the product 114 between the programs 112, which may increase complexity and difficulty in deciphering an actual failure and implementing a corresponding remediation.

Some embodiments of the present disclosure provide a technical solution to these and other technical limitations. For instance, the product analysis module 116 may implement one or more subroutines. Each of the subroutines may be directed to one of the programs 112. The subroutines include tests that evaluate one or more parameters or features of the corresponding program 112. Results of the tests may be itemized or organized according to the program 112 and/or the tests. The results may be caused to be displayed organized according to the programs 112. Additionally, the subroutines of the product analysis module 116 may include remediations. The remediations may be specifically configured to address issues of one of the tests. For instance, the remediations, when executed, may each make a change to the first endpoint 118A or to one of the programs 112. The remediations may resolve a technical issue at the endpoint 118 or the program 112 such that the program 112 successfully passes the test. The remediations may be automatically implemented or may be implemented responsive to selection by the user 124 or an administrator.

Accordingly, the product analysis module 116 may enable complete or a more complete assessment of the product 114 than conventional systems. Moreover, the product analysis module 116 individually assesses the programs 112, organizes results of tests of the programs 112, and automatically remediates technical issues.

The operating environment 100 may include the first endpoint 118A, a second endpoint 118B, and an administrative device 106 that may communicate data and information via a network 122. Each of these components are described in the following paragraphs.

The network 122 may include any communication network configured for communication of signals between the components (e.g., 118 and 106) of the operating environment 100. The network 122 may be wired or wireless. The network 122 may have numerous configurations including a star configuration, a token ring configuration, or another suitable configuration. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 122 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the administrative device 106 and the endpoints 118.

The administrator device 106 may include a hardware-based computing system. The administrator device 106 generally refers to a computing asset or device that is implemented to assess the product 114 on the endpoints 118. For example, the administrator device 106 may include a remote product analysis module 116B, which is remote to the endpoints 118. The product analysis module 116B may operate substantially similarly to the local product analysis module 116A of the first endpoint 118A or may implement one or more operations described with reference to the local product analysis module 116B. For example, in some embodiments, the administrative device 106 may receive results data from the local product analysis module 116A. The results data may be displayed locally at the administrative device 106 or may be stored. Additionally, the administrative device 106 may implement or initiate remediations on the endpoints 118.

The administrative device 106 may provide management of one or both of the private networks 120. The administrative device 106 might load the product 114 onto the first endpoint 118A. For instance, the administrative device 106 may load the product 114 onto the first endpoint 118A when the first endpoint 118A is incorporated into the first private network 120A. The diagnostic process may be implemented to ensure the product 114 is operational.

The endpoints 118 may be associated with users 124A and 124B (generally, user 124 or users 124). The users 124 may include a person or set of people who regularly operate or are otherwise affiliated with the endpoints 118. In some implementations, the users 124 may be uniquely associated with one of the endpoints 118. The user 124 may operate one of the endpoints 118 to operate the product 114 following evaluation by the product analysis module 116. Additionally, in some embodiments the user 124 may initiate a diagnostic process implemented by the product analysis module 116. Additionally or alternatively, the user 124 may interact with the product analysis module 116 to review results, initiate remediations, etc.

The users 124 may be individuals within an association or entity. For instance, the users 124 may have a particular job or role within the entity such as an engineer, a business leader, or a contractor. Additionally, the users 124 may have particular security or access privileges, which may be associated with the role. A first user 124A may have a separate or different role than a second user 124B or may have a similar role to the second user 124B.

The endpoints 118 may include hardware-based computing systems. The endpoints 118 generally refer to computing assets or devices such as a laptop computer, a desktop computer, a server device, a mobile device (e.g., tablet, smart phone, etc.), a printer, server devices, a smart screen, a telephone system, and the like.

In some embodiments, the endpoints 118 may be configured to manage other devices. For instance, the endpoints 118 may be communicatively coupled (e.g., via the network 122) to other devices to perform some management functions. The management functions may include unified endpoint management (UEM), service management, patch or update management, data access management, and the like.

The endpoints 118 may be integrated into a private network 120. The private networks 120 may be managed networks, which are configured to supervise and support devices of a particular entity such as an enterprise or government entity.

The product 114 may be configured to provide management functions related to the private network 120. For instance, the product 114 may include a first program 112A that is a patch management program, a second program 112B that is a service management program, etc. The product 114 may be a software as a service (SAAS) product that is overseen or supported by the administrative device 106.

The product 114 is loaded onto the endpoints 118. The product analysis module 116 may be configured to test and assess the product 114 prior to operation by the user 124 or during operation by the user 124. The product 114 may include multiple programs 112. The programs 112 may be included in a single product 114, but may be configured for analysis at least partially independently. For instance, the first program 112A may provide UEM service and the second program 112B may provide service management. The first and second programs 112A and 112B may operate based on common data (e.g., information and data related to the endpoint 118 and the users 124) but may implement substantially separate operations. Accordingly, the first program 112A may be tested independently of the second program 112B by the product analysis module 116.

The product analysis module 116 is configured to evaluate the product 114 deployed on the first endpoint 118A. In some embodiments, the product analysis module 116 may identify the programs 112 that are included in the product 114. The programs 112 may include a UEM program, a patch program, an information technology service management (ITSM) program, an endpoint management program (EPM) program, a cloud management program, a virtual private network (VPN) program, a patch update program, an asset management program, combinations thereof or another suitable program. In FIG. 1, the agent 208 is separate from the programs 112. However, in some embodiments, the agent 208 may be one of the programs 112 configured to operate on the first endpoint 118A.

The endpoints 118 might also include the agent 208. In some embodiments, the administrative device 106 may interface with the agent 208. For instance, the agent 208 may have a high level of privilege on the endpoints 118, which enables visibility of the product 114 as well as operational parameters related to or characterizing the product 114. The agent 208 may be configured to exist on the endpoints 118 to support ongoing management of the endpoints 118. The agent 208 may interface with local applications (e.g., the search feature) and may support communication of information back to the administrative device 106.

The product analysis module 116 may implement a diagnostic process at the first endpoint 118A or may implement the diagnostic process at a subset of the one or more endpoints 118. In some embodiments, the user 124 of the first endpoint 118A may initiate the diagnostic process. In some embodiments, the administrative device 106 may initiate the diagnostic process remotely.

The product analysis module 116 may include two or more subroutines. The subroutines may be directed to one of the programs 112. For instance, a first subroutine may be directed to the first program 112A and a second subroutine may be directed to the second program 112B.

The subroutines each execute tests that assess proper installation and functional parameters of the programs 112. In some embodiments a first set of installation and functional parameter tests of the first subroutine and a second set of installation and functional parameter tests of the first subroutine includes diagnostic different aspects of each program 112 of the product 114. The product analysis module 116 may execute the subroutines and tests therein, which may generate results data. The product analysis module 116 may itemize result data. The results may be itemized according to a corresponding program 112, subroutine, tests, or combinations thereof.

In response to the results of the first subroutine indicating that the program 112 is installed and operational at the first endpoint 118A, the product analysis module 116 may output data indicating the program 112 successfully passed the test. In response to a test returning an unexpected result or invalid result, the product analysis module 116 may output data indicating the program 112 failed and/or details of the test and the unexpected result. Additionally, the product analysis module 116 may implement a remediation. The remediation may be specific to the unexpected result and/or the failed test. The remediation may be configured to modify the program 112 that failed the test and/or modify a state or a condition at the first endpoint 118A to mitigate the unexpected result and enable the program 112 to pass the test.

The product analysis module 116 may cause display of data and information related to the diagnostic process. The product analysis module 116 may cause display of the data and information at the first endpoint 118A and/or the administrative device 106. For instance, the product analysis module 116 may cause display of a selectable instruction, icons that correspond to the programs 112. The selectable instruction may be configured to initiate at least a portion of the remediation. A first icon may be associated with the first program 112A and may indicate, for example, that the first program 112A successfully passed a first subroutine. A second icon may be associated with the second program 112B and may indicate, for example, that the data output by the second subroutine indicates that the second program 112B failed the second subroutine.

The product analysis module 116 may determine whether the second endpoint 118B is similar to the first endpoint 118A. The second endpoint 118B may be in the same private network 120 as the first endpoint 118A or in a separate private network 120. The product analysis module 116 may implement the remediation or some portion thereof at the second endpoint 118B. The product analysis module 116 may implement the remediation without implementing the diagnostic process at the second endpoint 118B. Implementation of the remediation without the diagnostic process may improve efficiencies in the operating environment 100. For instance, instead of independently testing each endpoint 118, the remediation is implemented based on characteristics of the endpoints 118 or users 124. This is an improvement over agent-based diagnostics that submit results data from every endpoint 118 prior to remediations being implemented.

The product analysis modules 116, the product 114, the programs 112, and components thereof may be implemented using hardware including a processor, a microprocessor (e.g., to perform or control performance of one or more operations), a field-programmable gate array (FPGA), or an application-specific integrated circuit (ASIC). In some other instances, the product analysis modules 116, the product 114, the programs 112, and components thereof may be implemented using a combination of hardware and software. Implementation in software may include rapid activation and deactivation of one or more transistors or transistor elements such as may be included in hardware of a computing system (e.g., the endpoints 118 or the administrative devices 106). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more administrative devices 106, one or more networks 122, one or more endpoints 118, or any combination thereof. Moreover, the separation of various components and servers in the embodiments described herein is not meant to indicate that the separation occurs in all embodiments.

Figure 2:
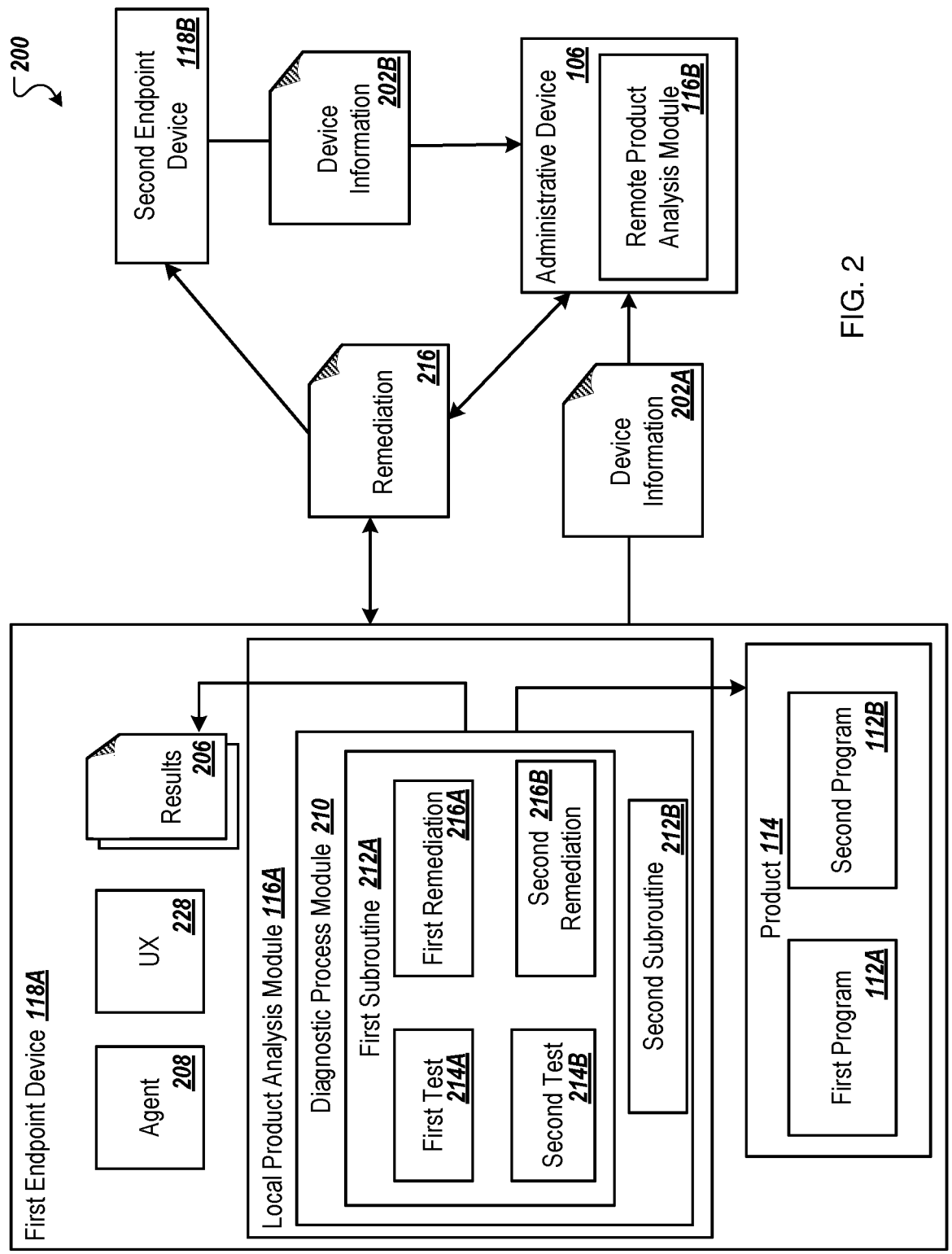
FIG. 2 depicts an example diagnostic process that may be implemented in the operating environment of FIG. 1.

FIG. 2 depicts an example diagnostic process 200 that may be implemented in the operating environment 100 of FIG. 1 or another suitable environment. FIG. 2 includes some components (e.g., 118, 116, 114, 106, etc.) described with reference to FIG. 1. Description of these components is not repeated. Additionally, although FIG. 2 does not include the network 122 of FIG. 1, it may be understood that some or all communications of the diagnostic process 200 may be via the network 122 or another suitable communication network.

In the embodiment of FIG. 1, the diagnostic process 200 is implemented at least partially by the local product analysis module 116 of the first endpoint 118A. Accordingly, details of the local product analysis module 116 of the first endpoint 118A are shown in FIG. 2. In other embodiments, the remote product analysis module 116B of the administrative device 106 may implement at least some portions of the diagnostic process 200. In these embodiments, the remote product analysis module 116B of the administrative device 106 may be substantially similar to the local product analysis module 116A of the first endpoint 118A as described with reference to FIG. 2.

The diagnostic process 200 may be implemented after the product 114 is installed at the first endpoint 118A. The diagnostic process 200 may be implemented to ensure the product 114 is functional and operational prior to allowing a user such as the user 124 of FIG. 1 employs the product 114. Additionally, the diagnostic process 200 may be implemented prior to installation of an agent 208. Accordingly, the diagnostic process 200 may be able to test functionality of the agent 208, the product 114, as well as communication and functionality between the product 114, the agent 208, and the administrative device 106.

In the depicted embodiment, the product analysis module 116 may include a diagnostic process module 210. The diagnostic process 200 may begin by the diagnostic process module 210 identifying the programs 112 in the product 114. For instance, the first program 112A and the second program 112B of the product 114 deployed on the first endpoint 118A may be identified by the diagnostic process module 210. In some embodiments, the programs 112 may include an agent such as the agent 208 or another program implemented on the first endpoint 118A such as an UEM program, a patch program, a ITSM program, a EPM program, a cloud management program, some portion thereof, combinations thereof, or another suitable program The diagnostic process module 210 may be specific to the product 114. For instance, the diagnostic process module 210 includes subroutines 212A and 212B, which may correspond to the programs 112 of the product 114. Specifically, a first subroutine 212A may be directed to and test the first program 112A and a second subroutine 212B may be directed to and test the second program 112B.

The subroutines 212 may include one or more tests 214A and 214B (generally, test 214 or tests 214). The tests 214 are configured to evaluate a parameter, a feature, a characteristic, or combinations thereof of one of the programs 112. For instance, the tests 214 may include programming instructions that perform one or more operations that evaluate functionality of a portion of one of the programs 112. Some of the tests 214 may be configured to evaluate whether the parameter of the program 112 is properly installed, a security parameter of the program 112, the function of the program 112, etc.

For example, in the embodiment of FIG. 2, the first subroutine 212A includes a first test 214A and a second test 214B. The first test 214A may test functionality of a first particular element or feature of the first program 112A. Similarly, the second test 214B may test functionality of a second particular element or feature of the first program 112A. Although not shown in FIG. 2, the second subroutine 212B may similarly include a set of installation and functional parameter tests directed to the second program 112B.

Some examples of the tests 214 of the subroutines 212 may include verification of locations of files and data of one of the programs 112 (e.g., network location or local location of files and data), verification of a profile or role of a user (e.g., the user 124) that implemented one of the programs 112, identification of a time involved in carrying out a computing process in one of the programs 112, verification of a version of one of the programs 112, verification of enrollment of one of the programs 112 with a second system, verification of a source of one of the programs 112, verification of a vendor of one of the programs 112, other tests, or combinations thereof.

The subroutines 212 and the tests 214 may be generated according to a template such as a script template. The template enables relatively simple and uniform development and implementation of the subroutines 212 and the tests 214. The template may provide a framework for data requests, commands, and instructions.

In some embodiments, the subroutines 212 may be scripts or be written using APPLE SWIFT™ or another suitable programming language. As used in the present disclosure, the scripts may include computing instructions implemented by another program or a scripting engine. An example of one of the tests 214 is depicted in FIG. 8.

In some embodiments, the subroutines 212 or some portion thereof may be signed. For instance, the subroutines may be signed with a digital certificate of a developer of the subroutine 212 or an administrator evaluating the product 114. Accordingly, in these and other embodiments, the subroutines 212 and/or one or more of the tests 214 may be signed scripts or signed APPLE SWIFT codes. Inclusion of a signature on the subroutines 212 may reduce or eliminate a security threat that may be introduced by implementation of the diagnostic process 200.

The subroutines 212 may also include remediations 216A and 216B (generally, remediation 216 or remediations 216). In some embodiments, the remediations 216 may correspond to the tests 214. For instance, the first test 214A may correspond to a first remediation 216A. The diagnostic process module 210 may implement the first remediation 216 in response to a result (e.g., result 206) that includes an unexpected or an erroneous value that indicates a failure of the first test 214A. Alternatively, in response to the results 206 indicating an expected value that indicates a successful application of the first test 214A, the first remediation 216A may not be implemented.

Accordingly, in an example embodiment, the first subroutine 212A may be directed to the first program 112 of the product 114. The first subroutine 212A may include the first test 214A and the second test 214B. When the first subroutine 212A is executed during evaluation of the product 114, the first test 214A may evaluate a first parameter or function of the first program 112A and the second test 214B may evaluate a second parameter or function of the first program 112A. Responsive to the first test 214A returning an expected or valid value, the first remediation 216A may not be implemented. Responsive to the second test 214B returning an unexpected or invalid value, the second remediation 216B may be implemented.

The remediations 216 may be specific to an unexpected or invalid value included in results 206 of one of the tests 214. For instance, the remediation 216 may be configured to modify the program 112 or a condition at the first endpoint 118A to mitigate the unexpected result, which may enable the program 112 to pass the test 214.

In some embodiments, the remediation 216 includes a change or modification to the product 114 or the endpoints 118 to address an unexpected or invalid result of one or more of the tests. For example, the remediation 216 may include reinstallation of one or more of the programs 112, downloading or reinstallation of the agent 208, requesting or updating a certificate of a user, requesting an updated certificate of a user, communication of a notification to a user or an administrator, increasing a time to complete a computing process at the endpoints 118, installation of a patch or product update, disabling the program 112 or a portion thereof.

Execution of the subroutines 212 may generate the results 206. The results 206 may be itemized or organized. For instance, the results 206 may be itemized or organized according to the subroutine 212 and/or the test 214 that generated the results 206 or to the program 112 being evaluated. For instance, a first portion of the results 206 may be itemized to correspond to the first subroutine 212A and a second portion of the results 206 may be itemized to correspond to the second subroutine 212B. Itemization may enable the assessment of portions of the program 112 at a parameter- or feature-level of granularity.

In addition, the subroutines 212 or the diagnostic process module 210 may be configured to output results data. The results data output by the subroutines 212 may be related to testing and evaluation of the programs 112. In some embodiments, the results data output by the subroutines 212 may be derived from and convey the results 206 of the subroutines 212. For instance, in response to the results 206 of the first subroutine 212A or one of the tests 214 therein indicating that the first program 112 is installed and operational at the first endpoint 118A, the results data output may include data indicating the first program 112 successfully passed the first subroutine 212A. The results data output may include details of the test 214 and the expected result. Similarly, in response to the first subroutine 212A or one of the tests 214 therein returning an unexpected result, the results data output may include data indicating the first program 112 or one of the tests 214 therein failed the first subroutine 212A. The results data output may include details of the test 214 and the unexpected result.

The results 206 may be communicated to a user interface (UX) 228. The results 206 may be displayed in the UX 228. For instance, the data and the instructions output by the diagnostic process 200 may be displayed in the UX 228 that may be presented to a user of the first endpoint 118A or to the administrative device 106. Some examples of the data and instructions that might be displayed at the UX 228 may include a selectable instruction configured to initiate at least a portion of the remediation 216, a first icon associated with the one of the programs 112 that indicates that the program 112 successfully passed one of the subroutines 212 or tests 214, a second icon associated with one of the programs 112 that indicates that the data output by one of the subroutines 212 or tests 214 indicates that the program 112 failed the subroutine 212, indications of one or more similar endpoints 118, other information and data, or combinations thereof. An example of the UX 228 is provided in FIG. 5.

In some embodiments, the administrative device 106 may be configured to collect device information 202A and 202B (generally, device information 202). For instance, the administrative device 106 may collect a first device information 202A from the first endpoint 118A and a second device information 202B from the second endpoint 118B. In these and other embodiments, an endpoint management operation (e.g., a unified endpoint management (UEM), a mobile device management (MDM) product, or an endpoint management (EPM) product, etc.) may be implemented by the administrative device 106 to obtain the device information 202. The device information may alternatively be supplied by another device such as a cloud system that collects the device information 202 or from an agent such as the agent 208 on the endpoints 118.

The device information 202 may include a device type, a role of users (e.g., the users 124) associated with the endpoints 118, a security status of the users, use of the endpoints 118, status of applications at the endpoints 118, inclusion in a managed network of the endpoints 118, update policies applied to the endpoints 118, locations (geographic location or network location), network connectivity type; other parameters, or combinations thereof.

In response to a determination that the second endpoint 118B is similar to the first endpoint 118A, the administrative device 106 may further implement the remediation 216 at the second endpoint 118B. The administrative device 106 may implement the remediation 216 without implementing the diagnostic process 200 at the second endpoint 118B.

Figure 3:
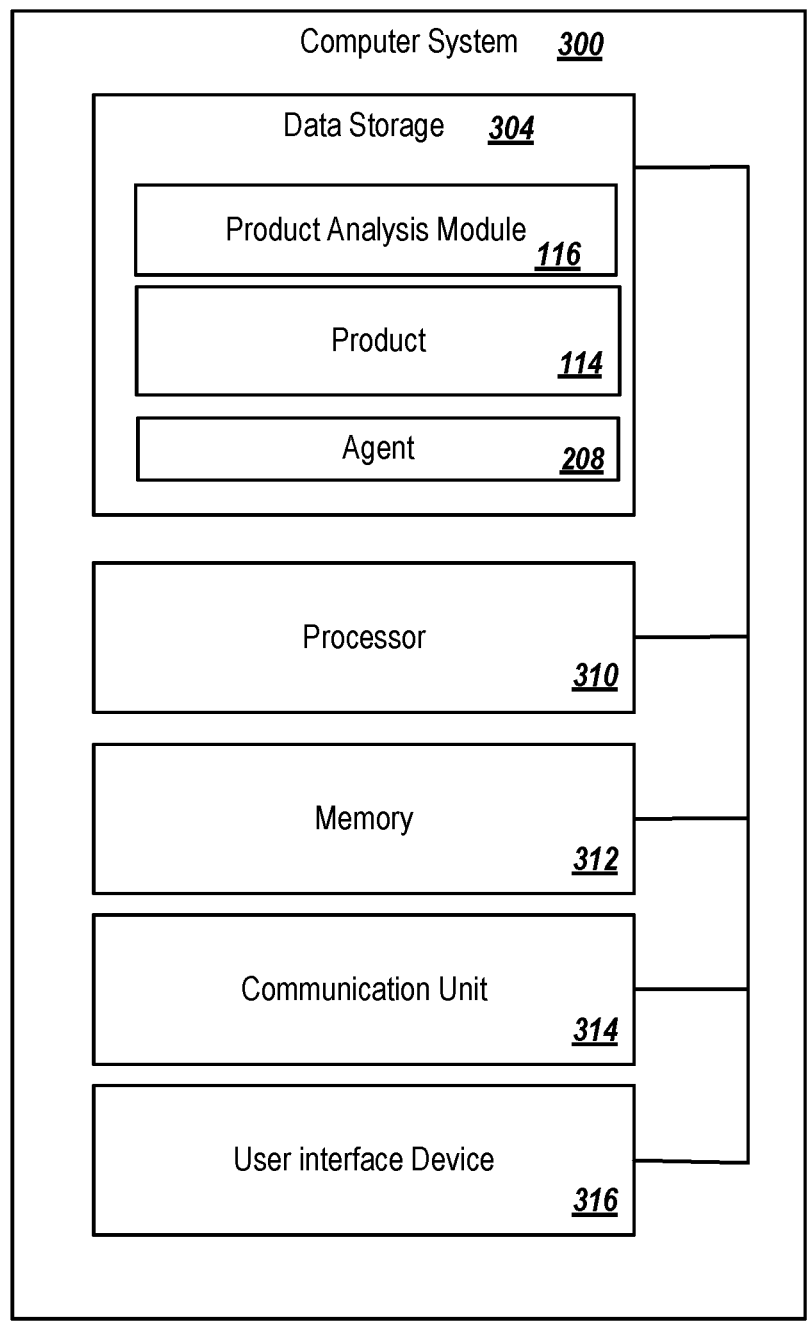
FIG. 3 illustrates an example computing system configured for product diagnosis.

FIG. 3 illustrates an example computing system 300 configured for product diagnosis according to at least one embodiment of the present disclosure. The computing system 300 may be implemented in the operating environment 100 of FIG. 1, for instance. Examples of the computing system 300 may include the endpoints 118 or the administrative device 106 or some combination thereof. The computing system 300 may include one or more processors 310, a memory 312, a communication unit 314, a user interface device 316, and a data storage 304 that includes the agent 208, the product 114, and the product analysis module 116 (collectively, modules 208/114/116).

The processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 3, the processor 310 may more generally include any number of processors configured to perform individually or collectively any number of operations described in the present disclosure. Additionally, one or more of the processors 310 may be present on one or more different electronic devices or computing systems. In some embodiments, the processor 310 may interpret and/or execute program instructions and/or process data stored in the memory 312, the data storage 304, or the memory 312 and the data storage 304. In some embodiments, the processor 310 may fetch program instructions from the data storage 304 and load the program instructions in the memory 312. After the program instructions are loaded into the memory 312, the processor 310 may execute the program instructions.

The memory 312 and the data storage 304 may include computer-readable storage media for carrying or having computer-executable instructions or data structures stored thereon. Such computer-readable storage media may include any available media that may be accessed by a general-purpose or special-purpose computer, such as the processor 310. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations.

The communication unit 314 may include one or more pieces of hardware configured to receive and send communications. In some embodiments, the communication unit 314 may include one or more of an antenna, a wired port, and modulation/demodulation hardware, among other communication hardware devices. In particular, the communication unit 314 may be configured to receive a communication from outside the computing system 300 and to present the communication to the processor 310 or to send a communication from the processor 310 to another device or network (e.g., 122 of FIG. 1).

The user interface device 316 may include one or more pieces of hardware configured to receive input from and/or provide output to a user. In some embodiments, the user interface device 316 may include one or more of a speaker, a microphone, a display, a keyboard, a touch screen, or a holographic projection, among other hardware devices.

The modules 208/114/116 may include program instructions stored in the data storage 304. The processor 310 may be configured to load the modules 208/114/116 into the memory 312 and execute the modules 208/114/116. Alternatively, the processor 310 may execute the modules 208/114/116 line-by-line from the data storage 304 without loading them into the memory 312. When executing the modules 208/114/116 the processor 310 may be configured to perform a participation verification process as described elsewhere in this disclosure.

Modifications, additions, or omissions may be made to the computing system 300 without departing from the scope of the present disclosure. For example, in some embodiments, the computing system 300 may not include the user interface device 316. In some embodiments, the different components of the computing system 300 may be physically separate and may be communicatively coupled via any suitable mechanism. For example, the data storage 304 may be part of a storage device that is separate from a server, which includes the processor 310, the memory 312, and the communication unit 314, that is communicatively coupled to the storage device. The embodiments described herein may include the use of a special-purpose or general-purpose computer including various computer hardware or software modules, as discussed in greater detail below.

Figure 4:
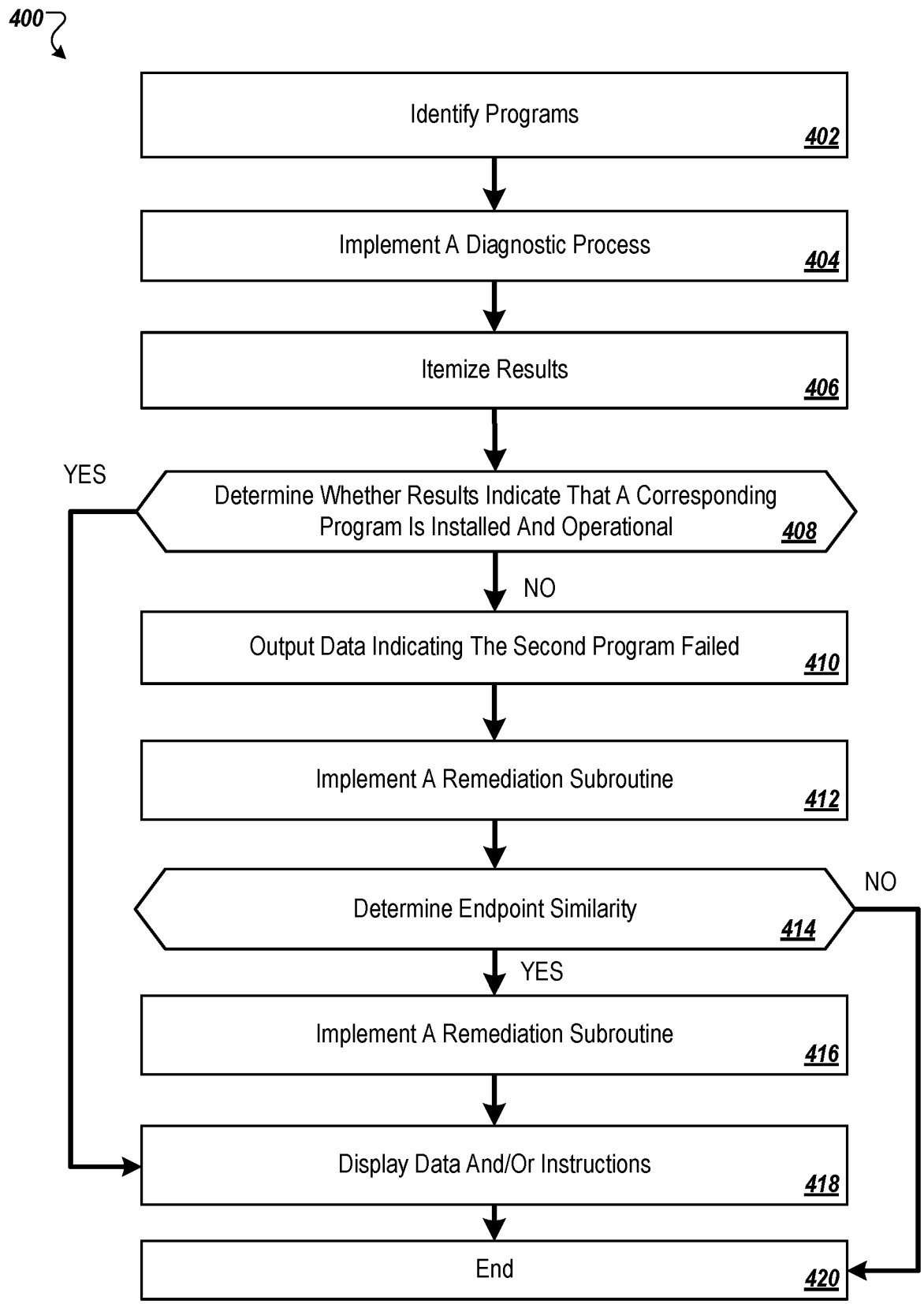
FIG. 4 is a flow diagram of a method of evaluating computer-implemented product that is deployed on an endpoint.

FIG. 4 is a flow diagram of a method 400 of evaluating computer-implemented product that is deployed on one or more endpoints according to at least one embodiment. The method 400 may be implemented in a manages network another suitable environment such as the operating environment 100. The operating environment implementing the method 400 may be included in a cloud-based networked system, an on-premises system, a managed network, managed subnetwork, or another suitable network computing environment.

The method may begin at block 402 in which one or more programs are identified. For instance, a first program and a second program of a product deployed on a first endpoint of one or more endpoints may be identified. The first and the second programs may include an agent that is configured to operate on the first endpoint, or another program implemented on the first endpoint such as an UEM program, a patch program, a ITSM program, a EPM program, a cloud management program, combinations thereof or another suitable program.

At block 404, a diagnostic process may be implemented. The diagnostic process may be implemented and a subset of the one or more endpoints or individually at the first endpoint. In some embodiments, a user of the first endpoint may initiate the diagnostic process. In some embodiments, a cloud management system or an administrative system may implement the diagnostic process remotely. Additionally, the diagnostic process may be implemented prior to operation or installation of an agent on the first endpoint.

The diagnostic process may include two or more subroutines. The subroutines may each be directed to a program that is included in the evaluated product. The diagnostic process may be organized similar to a bill of sale or list of programs with associated subroutines that test operation thereof. For instance, in some embodiments, the diagnostic process may include a first subroutine and a second subroutine of the two or more subroutines. The first subroutine may be directed to the first program and the second subroutine may be directed to a second program. The first and second subroutines each execute a set of installation and functional parameter tests of the first and second programs, respectively. For instance, the first subroutine includes a first set of installation and functional parameter tests and the second subroutine includes a second set of installation and functional parameter tests. The first set of installation and functional parameter tests may include some or all of the tests of the second set of installation and functional parameter tests.

In some embodiments the first set of installation and functional parameter tests and the second set of installation and functional parameter tests include are different for each program of the product. Some examples of the tests that may be included in the set of installation and functional parameter tests may include verification of locations of files and data of the first or the second programs, verification of a profile of a user that implemented the first or the second programs, identification of a time involved in carrying out a computing process in the first and the second programs, verification of a version of the first or the second programs, verification of enrollment of the first or the second programs with a second system, verification of a source of the first or the second programs, verification of a vendor of the first or the second programs, other suitable tests, or combinations thereof. In some embodiments the first subroutine and the second subroutine as well as other subroutines of the diagnostic process may be generated according to a template such as a script template. Additionally, in some embodiments the subroutines of the diagnostic process such as the first subroutine and the second subroutine may be signed by an entity or individual that developed the subroutine. For instance, the first subroutine and the second subroutine may be signed scripts.

At block 406, results of the two or more subroutines may be itemized. For instance, results of the first subroutine and the second subroutine may be itemized or organized. The results may be itemized according to a corresponding program. For instance, results of the first subroutine may be itemized or organized such that they are associated with the first program. Also, results of the second subroutine may be itemized or organized such that they are associated with the second program.

At block 408, it may be determined whether results of each of the two or more subroutines indicate that a corresponding program is installed and operational at the first endpoint. For instance, it may be determined whether the results of the first subroutine and the results of the second subroutine indicate that the first program and the second program are installed and operational at the first endpoint. In response to the results of the first subroutine indicating that the first program is installed and operational at the first endpoint, the method 400 may proceed to block 418. In response to the results of the second subroutine indicating that the second program is not installed and operational at the first endpoint, the method 400 may proceed to block 410. For instance, in response to a first test of the set of installation and functional parameter tests of the second subroutine returning an unexpected result, the method 400 may proceed to block 410. At block 410, data indicating the second program failed may be output. In some embodiments, the data output may include details of the first test and/or the unexpected result.

At block 412, a remediation may be implemented. The remediation may be specific to the unexpected result and/or to the first test. The remediation may be configured to modify the second program or a condition at the first endpoint to mitigate or resolve the unexpected result. Additionally or alternatively, the remediation may enable the second program to pass the first test. For instance, a change to the first test might be implemented. Some additional examples of the remediation may include reinstallation of the second program, download or an additional download of an agent, request a certificate of a user or an updated certificate of a user, communication of a notification to an administrator and/or a user, increase in a time to complete a computing process or the first test, installation of a patch or a product update, removal of the second program, disabling one or more portions of the second program, other remedial actions or combinations thereof.

At block 414 it may be determined whether a second endpoint of the one or more endpoints is similar to the first endpoint. Similarity between endpoints may include device type, role of users associated with the first and the second endpoints, function of the first and the second endpoints, products loaded on the first and the second endpoints, entities managing the first and the second endpoints, endpoint characteristics, network configuration associated with the endpoint characteristics, other parameters, or combinations thereof. In response to the second endpoint being similar to the first endpoint ("YES" at block 414), the method 400 may proceed to block 416. In response to the second endpoint being dissimilar to the first endpoint ("NO" at block 414), the method 400 may proceed to block 420.

At block 416, the remediation may be implemented. The remediation may be implemented at the second endpoint without implementing the diagnostic process at the second endpoint. For instance, the diagnostic process may be used to determine technical issues at the first endpoint. It may be assumed that the technical issue may also exist at other endpoints that are similar to the first endpoint. Accordingly, the remediation may be implemented on one or more of these similar endpoints. The second endpoint may be included in a managed network with the first endpoint or may be in another managed network.

At block 418, data and instructions output by the diagnostic process may be caused to be displayed. For instance, the data and the instructions output by the diagnostic process may be caused to be displayed in a user interface that may be presented to the user of the first endpoint or to administrative device. Some examples of the data and instructions that might be caused to be displayed may include a selectable instruction configured to initiate at least a portion of the remediation in the user interface; a first icon associated with the first program that indicates that the first program successfully passed the first subroutine, a second icon associated with the second program that indicates that the data output by the second subroutine indicates that the second program failed the second subroutine, indications of one or more similar endpoints, other information and data, or combinations thereof. At block 420, the method 400 may end.

Further, modifications, additions, or omissions may be made to the method 400 without departing from the scope of the present disclosure. For example, the operations of the method 400 may be implemented in differing order. Furthermore, the outlined operations and actions are only provided as examples, and some of the operations and actions may be optional, combined into fewer operations and actions, or expanded into additional operations and actions without detracting from the disclosed embodiments.

Figure 5:
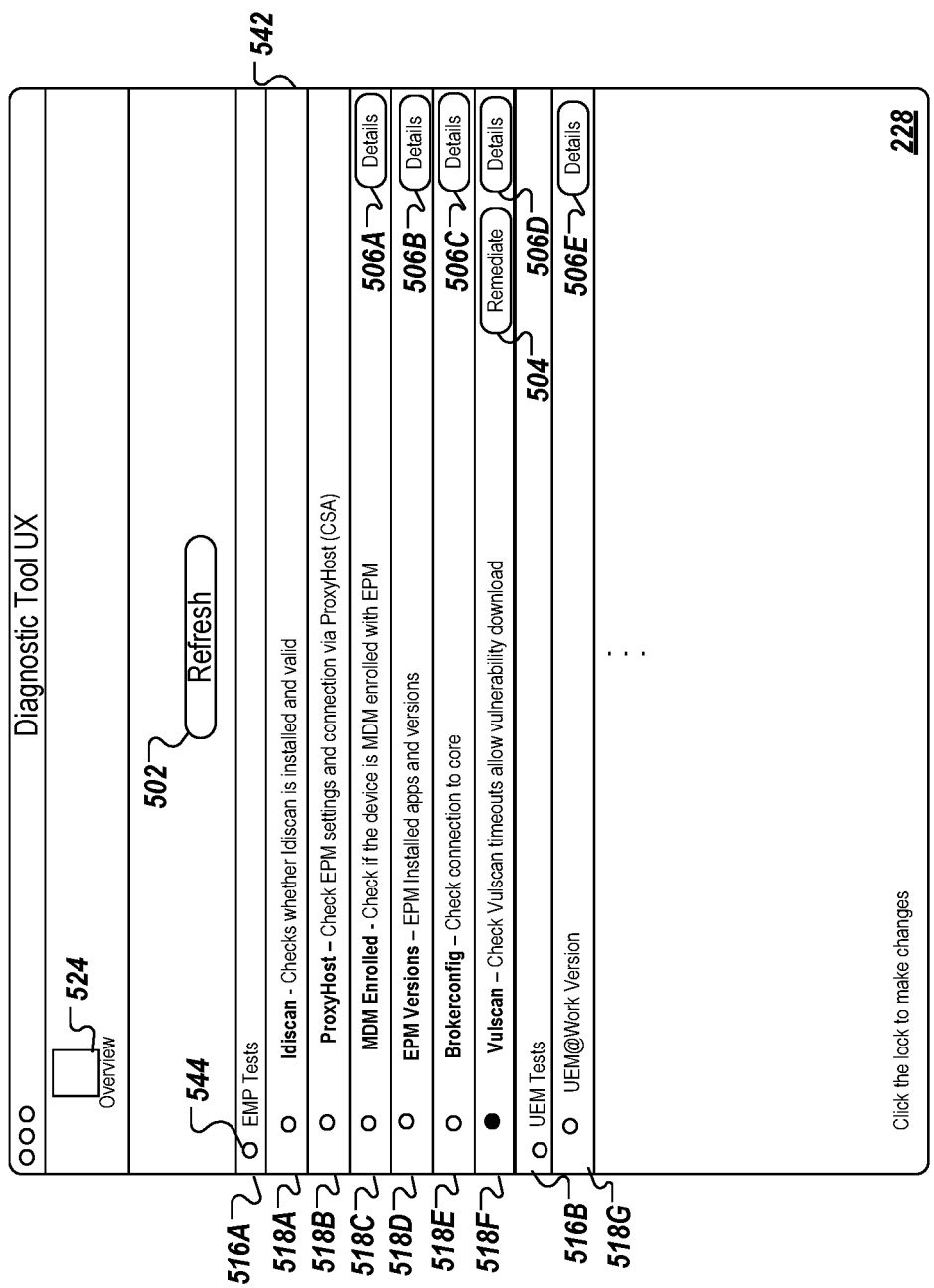
FIG. 5 depicts a block diagram of an example of user interface that may be implemented in the diagnostic process of FIG. 2.

FIG. 5 depicts a block diagram of an example of the UX 228. The UX 228 is labeled a diagnostic tool UX and the information presented in the UX 228 is depicted in response to an overview icon 524 being selected. The UX 228 may include a refresh icon 502. The refresh icon 502 may initiate the diagnostic process or a portion thereof.

The UX 228 may also include a test field 542. The test field 542 may include a list of programs 516A and 516B (generally, program 516 or programs 516) as well as tests 518A-518G (generally, test 518 or tests 518) that are implemented with the programs 516. The programs 516 may correspond and may be substantially similar to the programs 112. With each of the programs 516, pass/fail icons 544 may be displayed. The pass/fail icons 544 may indicate whether the test 518 passed or failed. In FIG. 5 only one of the pass/fail icons 544 is shown. Additionally, with each of the tests 518, details icons 506A-506E are displayed. Selection of the details icons 506A-506E provide details of the test 518 and/or details of results data generated by the test 518. In tests 518 that fail, the pass/fail icons 544 may be displayed differently and a remediate icon 504 may be displayed. For instance in a sixth test 518F, a VulScan test failed. Accordingly, the pass/fail icon 544 of the sixth test 518F is black (instead of white) and the remediate icon 504 is displayed. Selection of the remediate icon 504 may provide details related to a remediation that addresses the failed test 518F or the program on which the test 518F is implemented. Additionally or alternatively, selection of the remediate icon 504 may initiate a remediation process.

FIG. 6 depicts a block diagram of an example window 600 that may be displayed. For instance, the window 600 may be displayed on the endpoint 118 or administrative device 106. The window 600 may be displayed responsive to selection to a details icon such as one of the details icon 506 of FIG. 5. The window may provide information and data related to one of the tests implemented in a diagnosis process such as the diagnostic process 200 of FIG. 2. For instance, the window 600 provides versions of the agent and platform at an endpoint. Additionally, status information related to an agent and console may be provided. The installed engines at the endpoint may be further provided in the window 600.

FIG. 7 depicts an example of diagnostic status data 700 that may be generated during a diagnostic process such as the diagnostic process 200 of FIG. 2. The diagnostic status data 700 may include a series of operations that are implemented as one or more tests are executed. In the diagnostic status data, time of events are provided followed by a description of the operations. In the diagnostic status data 700 of FIG. 7, multiple connections are tested at particular IP addresses and a certificate is checked among other tests.

FIG. 8 is example programming code 800 that may be executed to perform one of the tests of a diagnostic process such as the diagnostic process 200 of FIG. 2. The programming code 800 illustrates an example code developed in APPLE SWIFT to diagnose MDM enrollment. The programming code 800 provides readouts provided responsive to failure and successful execution of portions of the programming code 800.

Figure 9:
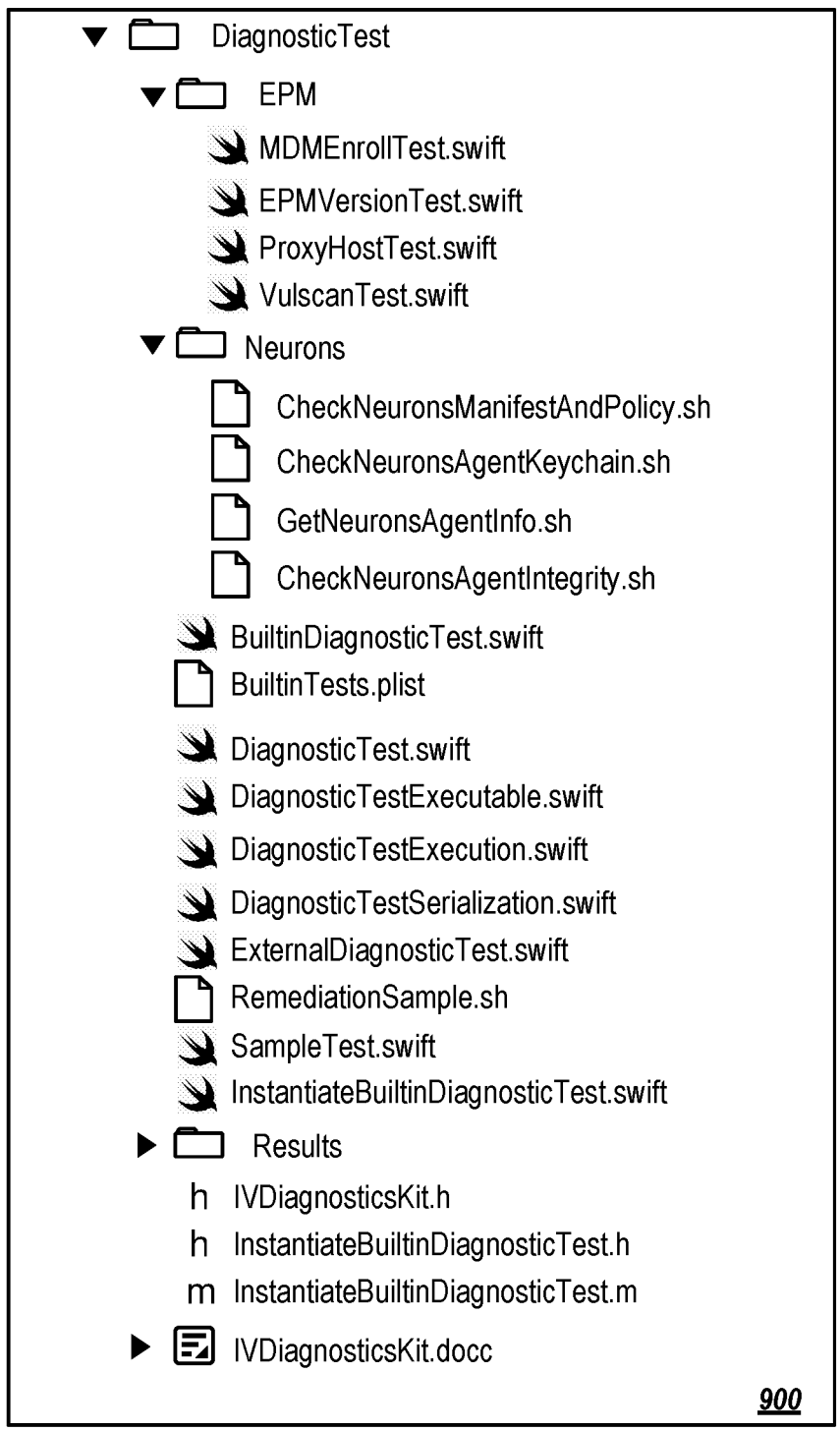
FIG. 9 is a high-level file structure that may be implemented in the diagnostic process of FIG. 2, all according to at least one embodiment described in the present disclosure.

FIG. 9 is a high-level file structure 900 that may be implemented in a diagnostic process such as the diagnostic process 200 of FIG. 2. As shown in the high-level file structure 900 the "Diagnostic Test" may include subroutines that are directed to programs such as EPM and Neurons. Within the subroutines, multiple tests are included. For instance, within the EPM subroutine, an MDMEnrollTest, an EPMVersionTest, a ProxyHostTest, and a VulscanTest are included. Execution of the EPM subroutine includes execution of each of the tests included therein. Additionally, the DiagnosticTest may include a "Results" folder. In the Results folder the results data output by the subroutines may be aggregated and itemized. Additionally still, the DiagnosticTests folder includes templates and kits to develop tests.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of evaluating computer-implemented product that is deployed on one or more endpoints, the method comprising:

identifying a first program and a second program of a product deployed on a first endpoint of one or more endpoints;

implementing a diagnostic process at the first endpoint, the diagnostic process including plurality of subroutines, wherein a first subroutine of the plurality of subroutines is directed to the first program and a second subroutine is directed to a second program, and wherein the first and second subroutines each execute a set of installation and functional parameter tests of the first and second programs, respectively;

itemizing results of the first subroutine and the second subroutine according to a corresponding program;

in response to the results of the first subroutine indicating that the first program is installed and operational at the first endpoint, outputting data indicating the first program successfully passed the first subroutine; and in response to a first test of the set of installation and functional parameter tests of the second subroutine returning an unexpected result:

outputting data indicating the second program failed the second subroutine and details of the first test and the unexpected result; and implementing a remediation specific to the unexpected result and the first test, the remediation being configured to modify the second program or a condition at the first endpoint to mitigate the unexpected result and enable the second program to pass the first test.

2. The method of claim 1, further comprising causing display of:
a selectable instruction configured to initiate at least a portion of the remediation in a user interface;
a first icon associated with the first program that indicates that the first program successfully passed the first subroutine; and
a second icon associated with the second program that indicates that the data output by the second subroutine indicates that the second program failed the second subroutine.

3. The method of claim 1, wherein the first program includes an agent deployed at the first endpoint.

4. The method of claim 1, wherein the set of installation and functional parameter tests include:
verifying locations of files and data of the first or the second programs;
verifying a profile of a user that implemented the first or the second programs;
identifying a time involved in carrying out a computing process in the first and the second programs;
verifying a version of the first or the second programs;
verify enrollment of the first or the second programs with a second system;
verify source of the first or the second programs; or
verify a vendor of the first or the second programs.

5. The method of claim 1, wherein a first set of installation and functional parameter tests of the first subroutine and a second set of installation and functional parameter tests of the first subroutine includes at least each diagnostic is different for each program of the product.

6. The method of claim 1, wherein the first subroutine and the second subroutine are generated according to a script template.

7. The method of claim 1, wherein one or both of the first subroutine or the second subroutine are signed scripts.

8. The method of claim 1, further comprising in response to a determination that a second endpoint of the one or more endpoints is similar to the first endpoint, further implementing the remediation at the second endpoint without implementing the diagnostic process at the second endpoint.

9. The method of claim 1, wherein the remediation includes one or more or a combination of:
reinstalling the second program;
downloading an agent;
requesting a certificate of a user or an updated certificate of a user;
communicating a notification to an administrator;
increasing a time to complete a computing process;
installing a patch or a product update; and
disabling the second program.

10. The method of claim 1, wherein the diagnostic process is implemented prior to operation or installation of an agent on the first endpoint.

11. One or more non-transitory computer-readable media having encoded therein programming code executable by one or more processors to perform or control performance of operations comprising:
identifying a first program and a second program of a product deployed on a first endpoint of one or more endpoints;
implementing a diagnostic process at the first endpoint, the diagnostic process including plurality of subroutines, wherein a first subroutine of the plurality of subroutines is directed to the first program and a second subroutine is directed to a second program, and wherein the first and second subroutines each execute a set of installation and functional parameter tests of the first and second programs, respectively;
itemizing results of the first subroutine and the second subroutine according to a corresponding program;
in response to the results of the first subroutine indicating that the first program is installed and operational at the first endpoint, outputting data indicating the first program successfully passed the first subroutine; and
in response to a first test of the set of installation and functional parameter tests of the second subroutine returning an unexpected result:
outputting data indicating the second program failed the second subroutine and details of the first test and the unexpected result; and
implementing a remediation specific to the unexpected result and the first test, the remediation being configured to modify the second program or a condition at the first endpoint to mitigate the unexpected result and enable the second program to pass the first test.

12. The non-transitory computer-readable media of claim 11, wherein the operations further comprise causing display of:
a selectable instruction configured to initiate at least a portion of the remediation in a user interface;
a first icon associated with the first program that indicates that the first program successfully passed the first subroutine; and
a second icon associated with the second program that indicates that the data output by the second subroutine indicates that the second program failed the second subroutine.

13. The non-transitory computer-readable media of claim 11, wherein the first program includes an agent deployed at the first endpoint.

14. The non-transitory computer-readable media of claim 11, wherein the set of installation and functional parameter tests include:
verifying locations of files and data of the first or the second programs;
verifying a profile of a user that implemented the first or the second programs;
identifying a time involved in carrying out a computing process in the first and the second programs;
verifying a version of the first or the second programs;
verify enrollment of the first or the second programs with a second system;
verify source of the first or the second programs; or
verify a vendor of the first or the second programs.

15. The non-transitory computer-readable media of claim 11, wherein a first set of installation and functional parameter tests of the first subroutine and a second set of installation and functional parameter tests of the first subroutine includes at least each diagnostic is different for each program of the product.

16. The non-transitory computer-readable media of claim 11, wherein the first subroutine and the second subroutine are generated according to a script template.

17. The non-transitory computer-readable media of claim 11, wherein one or both of the first subroutine or the second subroutine are signed scripts.

18. The non-transitory computer-readable media of claim 11, wherein the operations further comprise in response to a determination that a second endpoint of the one or more endpoints is similar to the first endpoint, further implementing the remediation at the second endpoint without implementing the diagnostic process at the second endpoint.

19. The non-transitory computer-readable media of claim 11, wherein the remediation includes one or more or a combination of:
- reinstalling the second program;
- downloading an agent;
- requesting a certificate of a user or an updated certificate of a user;
- communicating a notification to an administrator;
- increasing a time to complete a computing process;
- installing a patch or a product update; and
- disabling the second program.

20. The non-transitory computer-readable media of claim 11, wherein the diagnostic process is implemented prior to operation or installation of an agent on the first endpoint.

* * * * *